Sept. 28, 1965        P. J. OLSEN        3,208,471

FLUID LEVEL CONTROL VALVE

Filed June 26, 1963        2 Sheets-Sheet 1

Inventor
Poul J. Olsen
By Wilson & Geppert
Attorneys

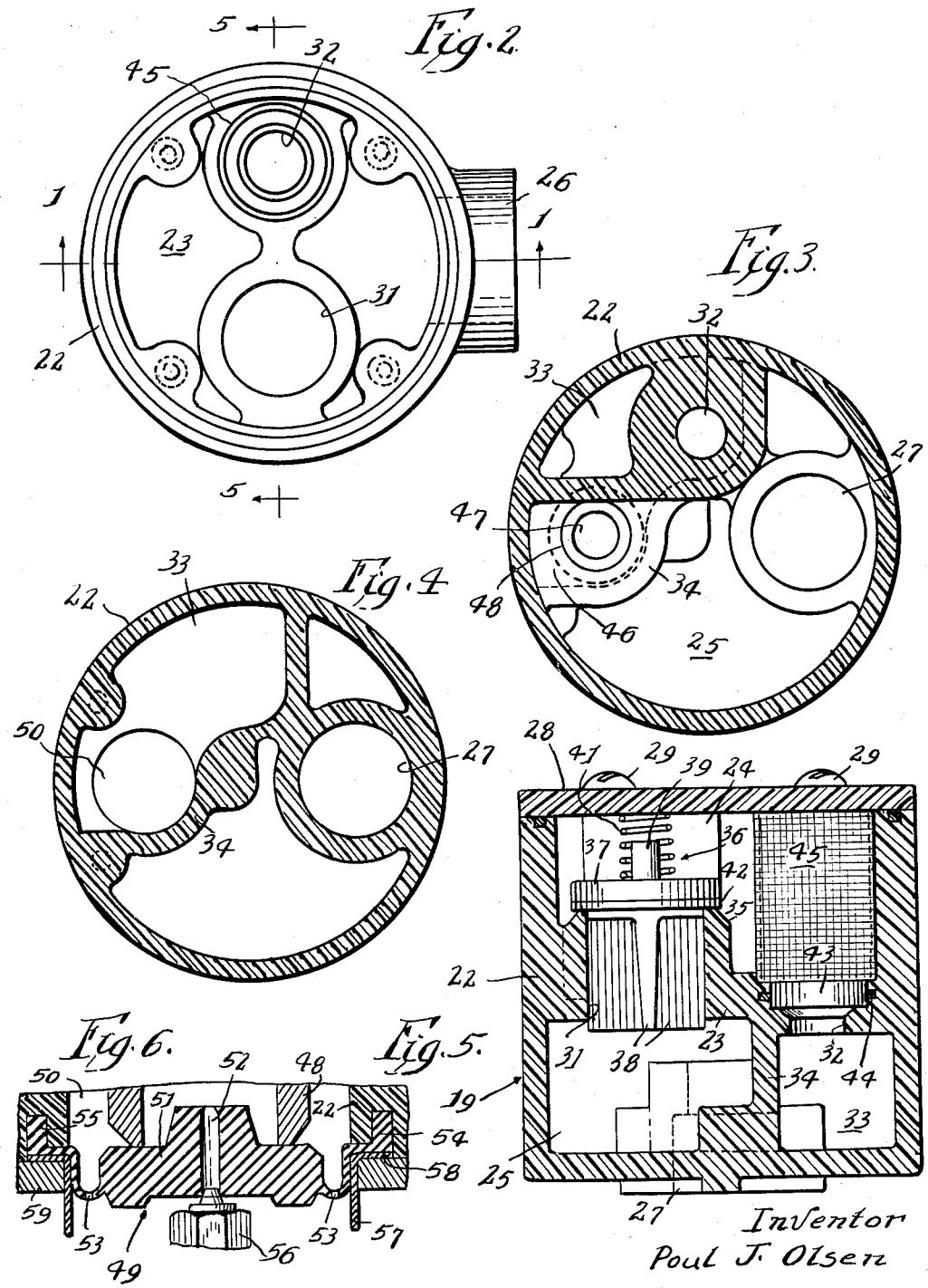

United States Patent Office 3,208,471
Patented Sept. 28, 1965

3,208,471
FLUID LEVEL CONTROL VALVE
Poul J. Olsen, Park Ridge, Ill., assignor to Culligan, Inc., Northbrook, Ill., a corporation of Delaware
Filed June 26, 1963, Ser. No. 290,751
12 Claims. (Cl. 137—391)

The present invention relates to a novel fluid level control valve and more particularly to a novel float actuated control valve with positive means to shut off flow to a brine storage tank or the like.

Where an automatically operated water softener or conditioner is installed in a home or other location, a brine storage tank is required to provide brine for the regeneration operation of the water softening material. In a normal operational cycle of a water softener, water is fed during the service stage from the softener tank through its automatic control valve to fill the brine storage tank to a predetermined maximum level; the water dissolving salt stored in the tank to form saturated brine. When the softener tank requires regeneration, the control valve assembly switches to a different flow path through an eductor or similar device to create a vacuum which communicates with the brine storage tank to withdraw the saturated brine from the tank until a predetermined minimum liquid level is reached; thus providing a measured quantity of brine. At the minimum liquid level, the brine supply is shut off and a rinsing stage is next provided. After the softener is properly rinsed, the control valve automatically returns to the service stage.

Most of the brine storage tanks previously and presently utilized with automatic water softeners have a float controlled valve to shut off liquid entering the tank when the maximum level is reached. The valve member is normally directly connected to the float through a float rod or chain and the distance travelled by the float to reach the maximum liquid level is relatively long. These shutoff valves directly connected to the float have not proved to be very accurate and the maximum level may vary considerably. The present invention, on the other hand, although utilizing a float, provides a substantially more accurate shut-off valve in the form of a diaphragm valve actuated in a novel manner by the float in the brine storage tank.

Among the objects of the present invention is the provision of a novel means to shut off flow to a brine storage tank which includes a resilient diaphragm mounted within a valve body and controlled liquid flow from an outer annular passage to an inner central passage past the diaphragm. The diaphragm is actuated by a reciprocable armature which is actuated by movement of a float and its associated float rod.

Another important object of the present invention is the provision of a shut-off means which is magnetically actuated to open position. The armature for the diaphragm is formed of a magnetic material and is normally spring-biased upwardly to a closed position. A magnet surrounds the housing for the armature and is normally spring-biased downwardly into contact with a guide member secured to the float rod. Movement of the magnet downwardly withdraws the armature from the diaphragm allowing opening movement of the diaphragm. When movement of the magnet is reversed, the armature is lifted into engagement with the diaphragm, and the armature and diaphragm are lifted to shut off liquid flow.

A further important object of the present invention is the provision of a float-controlled refill valve where the float has a relatively short distance for reciprocation which will result in increased efficiency in providing a positive shut-off for the refill operation. The shorter the distance of travel of the float and float rod, the less chance there is for error in moving the valve to closed position or in positioning the valve on its valve seat.

The present invention also comprehends the provision of a valve assembly having a spring-biased check valve in a passage permitting flow from the brine storage tank to the softener, but preventing flow in the opposite direction, and a second passage having a flow controller therein to control flow from the valve assembly of the softener to the brine tank for a refill operation. This valve system has been found useful in industrial installations where high brine flow rates from the brine storage tank are required.

Further objects are to provide a construction of maximum simplicity, efficiency, economy and ease of assembly and operation, and such further objects, advantages and capabilities as will later more fully appear and are inherently possessed thereby.

In the drawings:

FIG. 2 is a top plan view of the valve assembly with the cap and check valve removed to show the upper interior of the valve body.

FIG. 3 is a horizontal cross-sectional view taken on the line 3—3 of FIG. 1 and viewed in the direction of the arrows.

FIG. 4 is a horizontal cross-sectional view taken on the line 4—4 of FIG. 1.

FIG. 5 is a vertical cross-sectional view of the valve alone taken on the line 5—5 of FIG. 2.

FIG. 6 is an enlarged fragmentary view in horizontal cross section showing the construction of the diaphragm valve assembly of FIG. 1.

Figure 1:
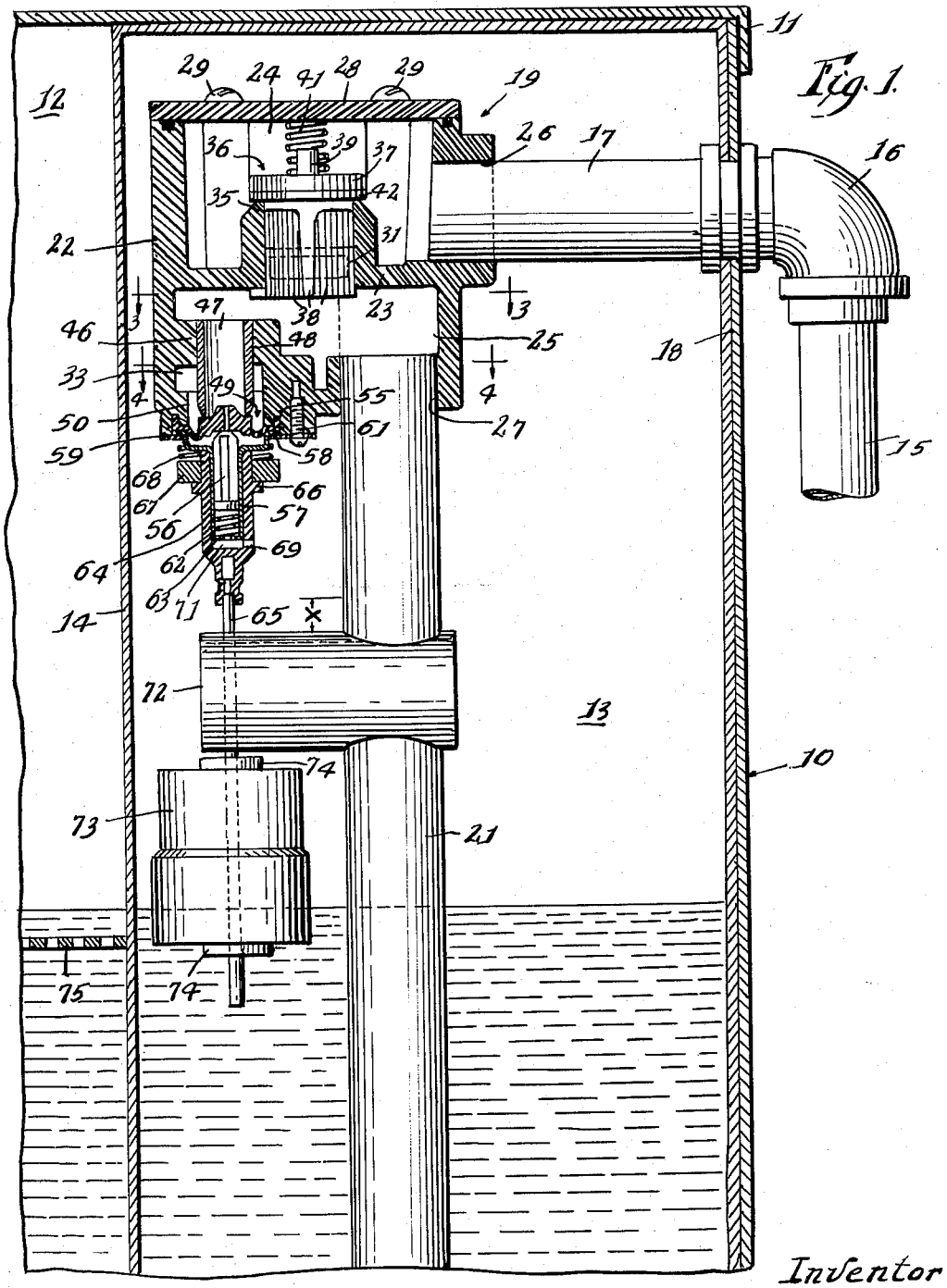
FIGURE 1 is a vertical cross-sectional view taken on the line 1—1 of FIG. 2 and showing the valve assembly and float mounted in a portion of a brine storage tank utilized with an automatic water softener or conditioner.

Referring more particularly to the drawing wherein is disclosed an illustrative embodiment of the present invention, FIG. 1 discloses a brine storage tank 10 having a cover or closure 11 fitting over the open top of the tank. The tank has a salt storage chamber 12 and a float chamber 13 separated by a wall 14 forming the float chamber; the chambers being connected by one or more small openings in the wall 14 adjacent the bottom of the tank 10.

A conduit 15 communicating with an eductor or similar device in a valve assembly on a water conditioner (not shown) communicates with an elbow 16 and a horizontal conduit 17 passing through the wall 18 of the tank into the float chamber 13. The conduit 17 is connected to the control valve assembly 19 in the float chamber 13; the valve assembly being positioned above the maximum liquid level in the tank. A vertical conduit 21 extends from the bottom of the valve assembly 19 and extends downward to terminate in a suitable upwardly extending air eliminator check valve such as shown in the Mahlstedt et al. application Serial No. 136,556, now Patent No. 3,146,788, entitled "Time Control Brine Refill System." The air eliminator valve determines the minimum liquid level in the tank.

The control valve assembly 19 includes an open-topped valve body 22 having a horizontal partition 23 dividing the valve body into upper and lower chambers 24 and 25, respectively. The horizontal conduit 17 communicates with the upper chamber 24 through a port 26, and the conduit 21 communicates with the lower chamber 25 through a port 27. A cover plate 28 is secured to the open topped valve body through bolts or other suitable securing means 29. As shown in FIG. 2, there are two spaced ports 31 and 32 extending through the horizontal partition 23; the port 31 communicating between the upper chamber 24 and the lower chamber 25, and the port 32 communicating between the upper chamber 24 and the intermediate chamber 33. The chamber 33 is located below the partition 23 and is separated from the lower chamber 25 by an irregular vertical wall 34 (FIG. 4).

The port 31 provides an upstanding valve seat 35 for a check valve 36 which has a circular base 37 of a diameter larger than the port 31 and four radially extending fins 38 projecting downward from the base into the port 31 and intersecting at the longitudinal axis of the valve. An upwardly extending projection 39 acts to position a compression spring 41 which bears against the valve 36 and at its opposite end bears against the cover plate 28 to resiliently bias the check valve to its closed position. An annular sealing ring 42 is positioned on the base 37 to sealingly engage the valve seat 35.

The port 32, as shown in FIG. 5, contains a flow controller 43 which is sealed in the port by a sealing ring 44. This flow controller 43 contains a resilient rubber washer with a central variable orifice area providing a substantially constant flow rate over a wide pressure range. The port narrows down below the flow controller 43 and then opens into the chamber 33. A cylindrical screen 45 is mounted between the flow controller 43 and the cover plate 28 to screen and filter any liquid passing therethrough.

The lower chamber 25 has a horizontally extending portion overlying a horizontal wall 46 (see FIGS. 1 and 3) which includes a port 47. A tubular member 48 extends downward through the wall 46 and terminates in a diaphragm chamber in an annular valve seat for a resilient diaphragm 49. The diaphragm is located within the diaphragm chamber and communicates with the chamber 33 through a port 50 which also surrounds the lower end of the tubular member 48.

The diaphragm 49 includes a generally thicker central portion 51 having a central opening 52 extending therethrough, a relatively thin web portion with a plurality of spaced bleed openings 53 and a thicker peripheral edge or bead 54 which is positioned within an annular recess 55 at the open bottom of the diaphragm chamber. An armature or valve member 56 of a magnetic material is mounted in a guide or housing 57 formed of brass or other suitable non-magnetic material; which guide has a flared-out bell-shaped end with a radial flange 58 engaging the peripheral bead 54 of the diaphragm 49. A plate 59 having an opening receiving the bell-shaped end of the guide 57 clamps the radial flange 58 and the peripheral bead 54 of the diaphragm 49 in the annular recess 55; the plate being attached to the valve body 22 by suitable securing means such as the screws 61.

A compression or armature spring 62 mounted between the armature 56 and the closed end 63 of the guide or housing 57 resiliently urges the upper end of the armature into engagement with the diaphragm 49 to normally close the central opening 52. A guide member 64 surrounds the guide 57 and slides relative thereto. The lower end of the guide member 64 is closed and secured to the upper end of a float rod 65. A radial flange 66 is formed on the exterior of the guide member spaced from the upper end thereof to receive and support an annular permanent magnet 67. The guide member 64 is formed of a non-magnetic material such as a suitable plastic. A second compression or load spring 68 is positioned to surround the bell-shaped end of the guide or housing 57 with one end abutting the plate 59 and the opposite end engaging the magnet 67 to resiliently urge the magnet and guide member 64 downwardly.

A vent opening 69 is formed in the guide member adjacent the closed end to vent the chamber 71 as the guide member 64 moves relative to the guide 57. A bracket 72 is secured to the vertical conduit 21 by any suitable means and has an opening to receive the float rod 65. A float 73 is adjustably secured to the float rod below the bracket 72 by any suitable means, such as resilient float retainers 74 which frictionally engage the float rod 65 and hold the float in a fixed position.

To fully understand the function of the valve assembly, a cycle of operation will be described. The salt storage chamber 12 is filled with a suitable salt, either granular, rock or pellet salt, with the salt resting on a gravel bed or a perforated plate 75 (FIG. 1). With the liquid level and valve assembly 19 as shown in FIG. 1, the storage tank is prepared with sufficient concentrated brine for a regeneration operation. When the softener tank is exhausted, the valve assembly on the tank will initiate a regeneration operation with the creation of a vacuum source which communicates with the control valve assembly 19 in the float chamber 13 through the conduit 15, elbow 16 and conduit 17.

The vacuum created in the upper chamber 24 lifts the check valve 36 against the action of the spring 41 to open the port 31 and allow communication with the lower chamber 25 to withdraw brine through a suitable air check valve such as shown in the Mahlstedt et al. application Serial No. 136,556, now Patent No. 3,146,788, this air check valve being positioned adjacent the bottom of the float chamber 13, vertical conduit 21 and port 27. Brine flows into and up through the lower chamber 25, port 31 and upper chamber 24 to exit through port 26 to the softener. The radial fins 38 on the check valve 36 not only guide this check valve in the port 31 but also allow full flow therearound.

As the level of brine in the tank 10 decreases, the float 73 is lowered carrying with it the float rod 65 and the guide member 64. As the float is lowered, the load spring 68 urges the magnet 67 and guide member 64 downwardly relative to the guide 57 and the magnetic force exerted by the magnet pulls the armature 56 downward against the force of the armature spring 62. Movement of the guide member 64 continues until the dimension "X" (see FIG. 1) is zero with the closed end 63 abutting the bracket 72. The dimension "X" is established to prevent the guide member 64 from disengagement with the guide 57.

The load spring 68 is of such strength as to be stronger than the armature spring 62 alone, but weaker than the sum of the force of the armature spring plus the buoyant force of the float 73. Although the load spring 68 is preferred, a dead weight located on top of the float 73 could be substituted for the load spring.

The position of the armature or valve 56 is controlled by the permanent magnet 67, and when the armature is pulled down by the magnet, the upper sealing end of the armature is withdrawn and opens the central passage 52 in the diaphragm 49 allowing fluid between the diaphragm and the guide 57 to vent, and with higher pressure under the diaphragm 49 from the port 50, the diaphragm also moves down to establish communication between the port 47 and the intermediate chamber 33 through the port 50. Thus, a second flow path for fluid flow out of the tank is established through port 47, port 50, chamber 33, and port 32 to port 26. Flow continues until the liquid level reaches the level of the valve seat in the air eliminator valve (not shown herein but such as of the type shown in the above mentioned Mahlstedt et al. patent), allowing its buoyant ball valve to seat stopping flow and preventing air from being drawn to the softener.

When the regeneration operation has been completed, the softener is returned to the service cycle and during the initial stages of service, water is returned through the conduit 15 to refill the brine softener tank. Once the withdrawal of brine has ceased, the spring 41 returns the check valve 36 to its closed position so that water cannot pass through port 31. Therefore, the water entering the upper chamber 24 passes through the screen 45, the flow controller 43, and the port 32 into the chamber 33, through the port 50 and past the diaphragm 49 and then through the port 47 into the lower chamber 25. From there, water passes through the port 27 and the vertical conduit 21 into the float chamber 13 and the salt storage chamber 12.

When the liquid level reaches the lowered float 73, the buoyancy of the float in the liquid plus the armature spring 62 will overcome the load spring 68 and the guide member 64 will start to move upward. The magnet 67 will also move upward allowing the armature spring 62 to return the armature 56 to its seat closing the passage 52 in the diaphragm 49. This prevents any venting of pressure from below the diaphragm, and the diaphragm then travels up in engagement with the armature as pressure increases below the diaphragm through the bleed openings 53 until it engages the tubular member 48 to shut off communication between the port 50 and port 47. This action shuts off refill flow.

The control valve assembly 19 is particularly useful for industrial softener installations where large quantities of brine and high flow rates from the tank 10 are required. However, this assembly may be utilized in home installations as shown or with certain modifications. One such modification would be the elimination of the flow controller 43 where a softener control valve connected to the conduit 15 incorporates a flow control means to limit the rate of refill flow to the brine tank 10. In that case, the rate of refill flow would be controlled prior to reaching the valve body 22 and liquid would pass through the screen 45 and the port 32 to the chamber 33 without the flow controller in the port 32.

A second modification of the valve assembly 19 would be the elimination of the check valve 36. This check valve is required where the port 31 is utilized to provide a substantial flow of brine to an industrial installation. If the brine flow out of the tank could be handled by the area of port 47, then the port 31 and the check valve 36 could be eliminated. This would also assume that the flow controller 43 could handle the desired rate of flow or the flow controller could also be removed. With removal of the check valve, the operation of the valve assembly would be modified in the brine withdrawal state.

Vacuum from the softener for regeneration will be present in the upper chamber 24 and the intermediate chamber 33 through the port 32 (the port 31 is eliminated). The vacuum also communicates with the area below the diaphragm 49 through the port 50 and the bleed openings 53 creating a negative pressure therein. Since atmospheric pressure acting on the liquid in the tank is transmitted to the central thicker portion 51 of the diaphragm through the port 47, the difference in pressure causes downward movement of the diaphragm against the force of the armature spring 62 and liquid is then drawn through the port 47, port 50, chamber 33 and port 32 to the upper chamber 24 and thence to the softener. When the float is lowered to lower the guide member 64, the magnet 67 and the armature 56, the diaphragm remains in its open position. The refill operation will be identical with that previously described for the preferred valve embodiment.

Although the valve assembly is not intended to be submerged, the passage of the concentrated brine through all of the ports and chambers of the valve body will enhance corrosion of any metal areas in the valve which are exposed to the brine. Therefore, substantially all of the parts of the valve assembly are formed of a suitable corrosion resistant plastic material. The armature guide or housing is formed of a non-magnetic material such as brass and the armature is formed of a magnetic material. The guide member supporting the magnet is also formed of a suitable plastic.

While the valve assembly has been shown and described as being advantageously applicable to a brine storage tank utilized with an industrial water softener or conditioner, it is not my desire or intent to unnecessarily limit the scope or the utility of the improved features by virtue of this illustrative embodiment.

Having thus disclosed the invention, I claim:

1. A fluid level control valve comprising a valve body having upper and lower chambers, said upper chamber communicating with a source of alternate liquid pressure and vacuum, and said lower chamber communicating with a float chamber within a tank, a diaphragm chamber interposed between and communicating with said upper and lower chambers, a tubular member opening into said lower chamber and extending downwardly into the diaphragm chamber and terminating in an annular seat, a flexible diaphragm in said diaphragm chamber and reciprocating between a closed position seating on said annular seat and an open position allowing fluid flow between said chambers, a float rod positioned below the diaphragm and exteriorly of the valve body, a float on the lower end of said float rod, a guide member secured to the opposite end of the float rod and surrounding and reciprocating relative to a depending portion of said valve body, reciprocable means in said valve body below the diaphragm which in one position is effective to move the diaphragm to closed position and moves to a second position allowing the diaphragm to move to open position, and means supported on said guide member and adapted to actuate said first mentioned means upon reciprocation of the guide member relative to said valve body.

2. A fluid level control valve as set forth in claim 1, in which said first mentioned means is an upwardly biased armature, and said diaphragm has a central passage adapted to be closed by said armature and bleed openings circumferentially spaced about and adjacent the edge of said diaphragm.

3. A fluid level control valve as set forth in claim 1, including a guide housing depending below the diaphragm, said first mentioned means comprises a magnetic armature mounted for reciprocation in said guide housing, and said second mentioned means is a magnet encompassing the guide member.

4. A fluid level control valve as set forth in claim 1, including an intermediate chamber communicating between said upper and diaphragm chambers and a flow controller mounted between said upper and intermediate chambers.

5. A fluid level control valve comprising a valve body having upper and lower chambers therein, an intermediate chamber separated from but communicating with said upper and lower chambers, said upper chamber communicating with a source of alternate liquid pressure and vacuum, said lower chamber communicating with a liquid storage tank, a port directly connecting said upper and lower chambers, a check valve located in said upper chamber and adapted to close said port, means biasing said check valve into engagement with and closing said port, a port between said intermediate and lower chambers, a tubular member extending downwardly from said last mentioned port into the intermediate chamber and terminating in an annular seat, a flexible diaphragm positioned between said intermediate and lower chambers and reciprocating between an open position away from the annular seat to a closed position abutting the annular seat to open and close said last mentioned port, means positioned below said diaphragm reciprocating between a first position to move said diaphragm to closed position and a second position allowing the diaphragm to move to open position, a housing depending from said valve body below said diaphragm for said actuating means, and reciprocating means adapted to actuate said diaphragm actuation means.

6. A fluid level control means as set forth in claim 5, in which said check valve is adapted to be lifted off of said port between the upper and lower chambers under vacuum to draw liquid through said chambers.

7. A fluid level control valve as set forth in claim 5, in which said diaphragm has a central passage and circumferentially spaced bleed openings adjacent the edge of the diaphragm, and said diaphragm actuation means includes a reciprocable magnetic armature normally yieldably biased upward to close the central passage in said diaphragm.

8. A fluid level control valve as set forth in claim 7, including a guide member encompassing said housing and reciprocable relative thereto, and said last mentioned reciprocating means including a magnet supported on said guide member for reciprocation therewith.

9. A fluid level control valve as set forth in claim 8, including a float rod secured to and depending from the lower end of said guide member, a float on said float rod, an armature spring biasing said armature upwardly, and a load spring biasing said magnet and said guide member downwardly, said load spring having a force greater than the force of the armature spring alone but less than the sum of the force of the armature spring plus the buoyant force of the float.

10. A fluid level control valve as set forth in claim 5, in which a flow controller is located in the port between the upper chamber and the intermediate chamber and a cylindrical screen is located in said upper chamber and extends between the flow controller and the top of the upper chamber.

11. A fluid level control valve comprising a valve body having upper and lower chambers, said upper chamber communicating with a source of alternate liquid pressure and vacuum and with the lower chamber, and said lower chamber communicating with a float chamber within a tank, a diaphragm chamber interposed between said upper and lower chambers and housing a flexible diaphragm reciprocating between open and closed positions to control fluid flow between the chambers, a guide housing depending below the diaphragm, a float rod positioned below the diaphragm and exteriorly of the valve body, a float on said float rod adjacent one end thereof, a guide member secured to the opposite end of the float rod encompassing the guide housing and reciprocating relative thereto, a magnetic armature mounted for reciprocation in said guide housing to actuate said diaphragm, an armature spring yieldably biasing said armature upwardly, a magnet encompassing and supported on said guide member actuating said armature upon reciprocation of the guide member relative to said guide housing, and a load spring yieldably biasing said magnet and guide member downwardly.

12. A fluid level control valve as set forth in claim 11, in which the force of the load spring is greater than the force of the armature spring alone, but less than the sum of the force of the armature spring plus the buoyant force of the float in a liquid.

References Cited by the Examiner

UNITED STATES PATENTS

| | | | |
|---|---|---|---|
| 2,752,936 | 7/56 | Cantalupo | 137—414 |
| 2,906,285 | 9/59 | Rosten et al. | 137—391 |
| 3,062,186 | 11/62 | Cordis | 251—65 XR |

WILLIAM F. O'DEA, *Primary Examiner.*